(12) United States Patent
Sumitani

(10) Patent No.: US 12,065,109 B2
(45) Date of Patent: Aug. 20, 2024

(54) VEHICLE LAMP SYSTEM, FOREIGN SUBSTANCE DETERMINATION DEVICE, AND FOREIGN SUBSTANCE DETERMINATION METHOD

(71) Applicant: KOITO MANUFACTURING CO., LTD., Tokyo (JP)

(72) Inventor: Hiroki Sumitani, Shizuoka (JP)

(73) Assignee: KOITO MANUFACTURING CO., LTD., Tokyo (JP)

( * ) Notice: Subject to any disclaimer, the term of this patent is extended or adjusted under 35 U.S.C. 154(b) by 0 days.

(21) Appl. No.: 17/766,987

(22) PCT Filed: Oct. 5, 2020

(86) PCT No.: PCT/JP2020/037745
§ 371 (c)(1),
(2) Date: Apr. 6, 2022

(87) PCT Pub. No.: WO2021/075299
PCT Pub. Date: Apr. 22, 2021

(65) Prior Publication Data
US 2024/0101073 A1 Mar. 28, 2024

(30) Foreign Application Priority Data
Oct. 18, 2019 (JP) ................................ 2019-190783

(51) Int. Cl.
*B60S 1/00* (2006.01)
*B60Q 1/00* (2006.01)
(Continued)

(52) U.S. Cl.
CPC ............ *B60S 1/603* (2013.01); *B60Q 1/0023* (2013.01); *B60Q 1/085* (2013.01); *G01N 21/94* (2013.01);
(Continued)

(58) Field of Classification Search
CPC ... B60Q 1/085; G01N 21/94; G01N 21/95607
See application file for complete search history.

(56) References Cited

U.S. PATENT DOCUMENTS

| 2005/0035926 A1* | 2/2005 | Takenaga .............. B60S 1/0818 345/8 |
| 2013/0208120 A1* | 8/2013 | Hirai ........................ H04N 7/18 348/148 |

(Continued)

FOREIGN PATENT DOCUMENTS

| JP | 2010-146284 A | 7/2010 |
| JP | 2012-218705 A | 11/2012 |

(Continued)

OTHER PUBLICATIONS

International Search Report issued on Nov. 10, 2020 for WO 2021/075299 A1 (4 pages).

*Primary Examiner* — Gerald J Sufleta, II
(74) *Attorney, Agent, or Firm* — Venjuris, P.C.

(57) ABSTRACT

A vehicle lamp system includes: a vehicle lamp that emits light to a front area of a vehicle thereby forming a predetermined light distribution pattern; an imaging device that captures an image of the front area of the vehicle; and a foreign substance determination device including a storage unit that stores a light distribution pattern formed in the front area by the vehicle lamp in a state where no foreign substance adheres to a light emitting surface as a reference pattern, and a determination unit that compares a light distribution pattern captured by the imaging device with the reference pattern and determines whether a foreign substance adheres to the light emitting surface based on a determination result.

8 Claims, 3 Drawing Sheets

(51) Int. Cl.
 *B60Q 1/08* (2006.01)
 *B60S 1/60* (2006.01)
 *G01N 21/94* (2006.01)
 *G01N 21/956* (2006.01)

(52) U.S. Cl.
 CPC .................. *G01N 21/95607* (2013.01); *G01N 2021/95615* (2013.01)

(56) References Cited

U.S. PATENT DOCUMENTS

2019/0086773 A1* 3/2019 Okamura ........... G02B 27/0006
2020/0274994 A1* 8/2020 Sunaga ................. G03B 15/00

FOREIGN PATENT DOCUMENTS

| JP | 2014-043121 A | 3/2014 |
| JP | 2016-168915 A | 9/2016 |
| JP | 2019-064471 A | 4/2019 |

\* cited by examiner

VEHICLE LAMP SYSTEM, FOREIGN SUBSTANCE DETERMINATION DEVICE, AND FOREIGN SUBSTANCE DETERMINATION METHOD

CROSS REFERENCE TO RELATED APPLICATIONS

This application is a national phase of PCT application No. PCT/JP2020/037745, filed on 5 Oct. 2020, which claims priority from Japanese patent application No. 2019-190783, filed on 18 Oct. 2019, all of which are incorporated herein by reference.

TECHNICAL FIELD

The present disclosure relates to a vehicle lamp system, a foreign substance determination device, and a foreign substance determination method.

BACKGROUND

A vehicle lamp plays an important role in a safe driving at night or in a tunnel. If a foreign substance such as the mud or snow adheres to a light emitting surface of the vehicle lamp, the formation of a light distribution pattern toward the front of an own vehicle may be hindered, so that the visibility of the driver may be reduced. In order to solve such a problem, for example, a cleaning device that injects a cleaning liquid from an injection nozzle to clean the light emitting surface of the vehicle lamp is proposed in Patent Document 1.

PRIOR ART DOCUMENT

Patent Document

Patent Document 1: Japanese Laid-Open Patent Publication No. 2012-218705

SUMMARY OF THE INVENTION

Problem to be Solved

In the related art, the dirt on the light emitting surface of the vehicle lamp has been detected by the driver or other passengers noticing that the front remains dark even when the vehicle lamp is turned on, or by the driver or the like visually checking the light emitting surface from the outside of the vehicle. As a result, the dirt on the light emitting surface may be unnoticed and left. In this case, a state in which the safety of vehicle driving is reduced is continued.

The present disclosure has been made in consideration of the circumstances, and one object thereof is to provide a technology of increasing the safety of vehicle driving.

Means to Solve the Problem

One aspect of the present disclosure is a vehicle lamp system. The vehicle lamp system includes a vehicle lamp configured to emit light to a front area of a vehicle to form a predetermined light distribution pattern, an imaging device configured to capture an image of the front area, and a foreign substance determination device including a storage unit that stores a light distribution pattern formed in the front area by the vehicle lamp in a state where no foreign substance adheres to a light emitting surface as a reference pattern, and a determination unit that compares a light distribution pattern captured by the imaging device with the reference pattern and determines whether a foreign substance adheres to the light emitting surface.

Another aspect of the present disclosure is a foreign substance determination device. The foreign substance determination device includes a storage unit configured to store a light distribution pattern formed by a vehicle lamp that emits light to a front area of a vehicle to form a predetermined light distribution pattern in the front area in a state where no foreign substance adheres to a light emitting surface as a reference pattern, and a determination unit configured to compare a light distribution pattern captured by an imaging device that captures an image of the front area, with the reference pattern, and determine whether a foreign substance adheres to the light emitting surface.

Another aspect of the present disclosure is a foreign substance determination method. The foreign substance determination method includes comparing a light distribution pattern formed by a vehicle lamp that emits light to a front area to form a predetermined light distribution pattern in a state where no foreign substance adheres to a light emitting surface, with a light distribution pattern captured by an imaging device that captures an image of the front area, and determining whether a foreign substance adheres to the light emitting surface.

Any combination of the above-described constituent elements, and those obtained by converting expressions of the present disclosure among methods, devices, and systems are also effective as aspects of the present disclosure.

Effect of the Invention

According to the present disclosure, the safety of vehicle driving may be increased.

DETAILED DESCRIPTION TO EXECUTE THE INVENTION

Hereinafter, suitable embodiments of the present disclosure will be described with reference to the drawings. The embodiments are not intended to limit the present disclosure thereto, but are merely illustrative. All features described in the embodiments or combinations thereof may not be essential for the present disclosure. Identical or corresponding components, members, and processes in each of the drawings will be denoted by the same symbols, and overlapping descriptions thereof will be appropriately omitted. Further, a scale or a shape of each component illustrated in each of the drawings is conveniently set in order to facilitate descriptions thereof and should not be construed as being limited unless specified. In addition, unless otherwise mentioned, for example, the terms "first" and "second" used herein or in the claims are not intended to refer to any order or importance but are intended to discriminate a component from another component. Further, a portion of members which are not important in describing the embodiment is omitted and displayed in each drawing.

Figure 1:
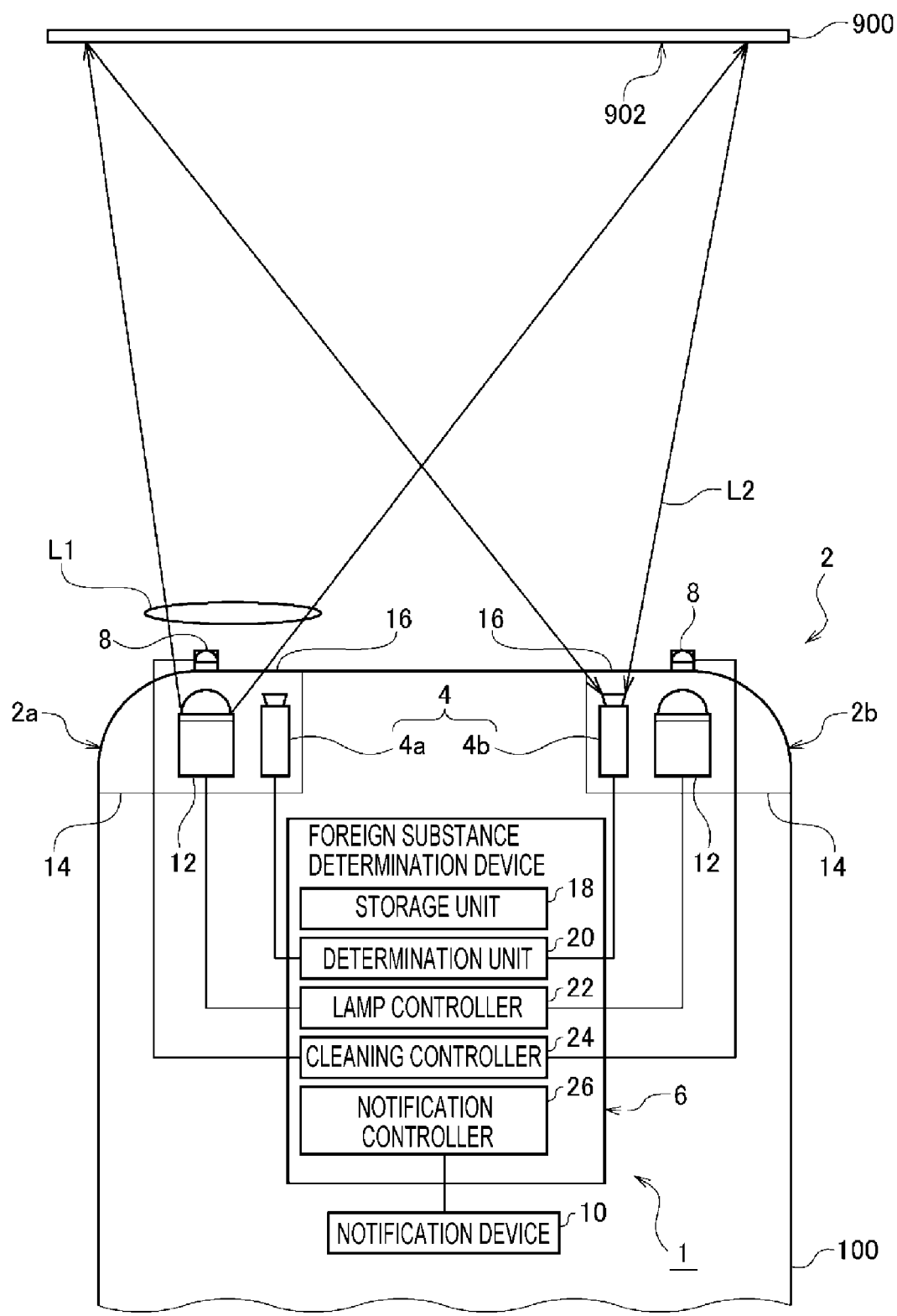
FIG. 1 is a block diagram of a vehicle lamp system according to an embodiment.
Figure 2B:
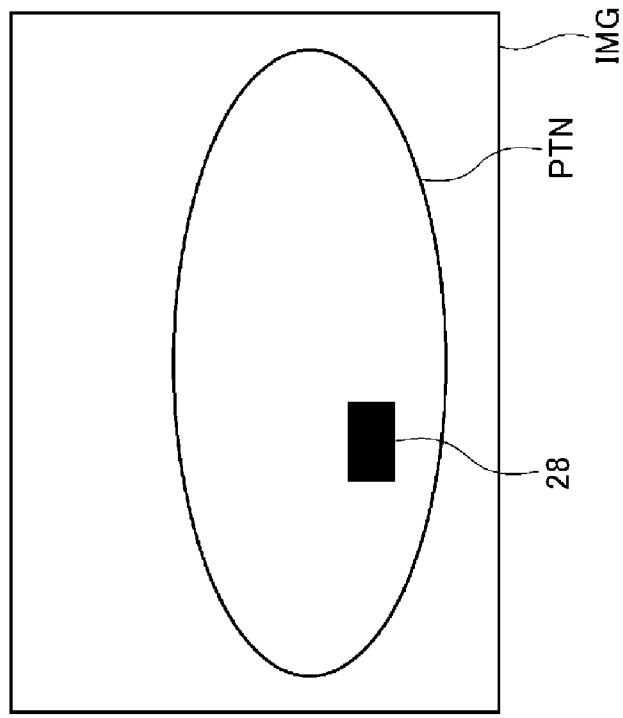
FIG. 2B is a schematic view illustrating a light distribution pattern formed in a state where a foreign substance adheres to a light emitting surface.
Figure 2A:
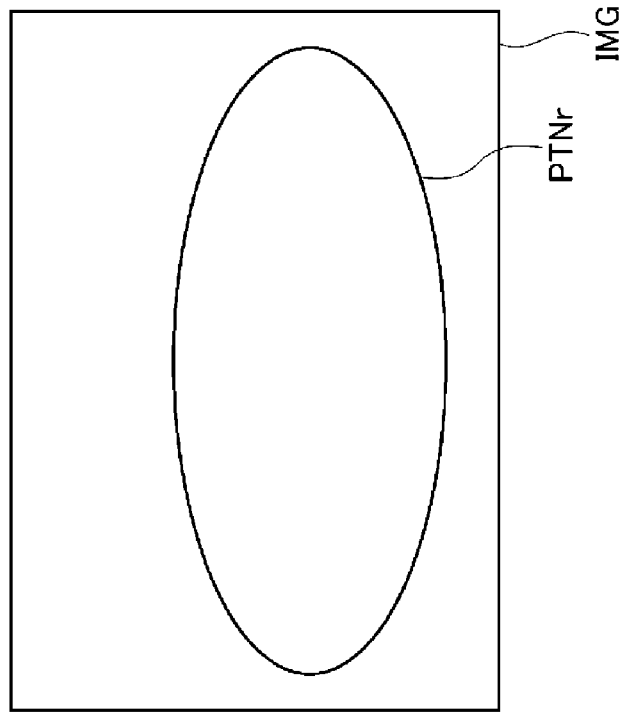
FIG. 2A is a schematic view illustrating a reference pattern.

FIG. 1 is a block diagram of a vehicle lamp system according to an embodiment. FIG. 2A is a schematic view illustrating a reference pattern. FIG. 2B is a schematic view illustrating a light distribution pattern formed in a state where a foreign substance adheres to a light emitting surface. In FIG. 1, a portion of components of a vehicle lamp system 1 is drawn as a functional block. These functional blocks are implemented by elements or circuits including a CPU or a memory of a computer as a hardware configuration, and implemented by, for example, a computer program as a software configuration. Those skilled in the art would understand that these functional blocks may be implemented in various ways, for example, by a combination of hardware and software.

The vehicle lamp system 1 includes a vehicle lamp 2, an imaging device 4, a foreign substance determination device 6, a cleaning device 8, and a notification device 10.

The vehicle lamp 2 is a device capable of emitting light to the front area of a vehicle 100 to form a predetermined light distribution pattern PTN. For example, the vehicle lamp 2 irradiates a visible light beam L1 to the front area of the vehicle 100. The light distribution pattern PTN is grasped as a two-dimensional illuminance distribution of an irradiation pattern 902 formed by the vehicle lamp 2 on a virtual vertical screen 900 in front of an own vehicle.

The vehicle lamp 2 includes a light source unit 12 and a housing 14 that accommodates the light source unit 12. The structure of the light source unit 12 is not particularly limited. For example, the light source unit 12 may include a semiconductor light emitting element such as a light emitting diode (LED), a laser diode (LD), or organic or inorganic electroluminescence (EL), or a light source such as an incandescent bulb, a halogen lamp, or a discharge bulb, and a turning-ON circuit configured to drive and turn ON the light source. Further, the light source unit 12 may include: a reflector; a projection lens; a matrix-type pattern forming device such as a digital mirror device (DMD) or a liquid crystal device; and a scan optical type pattern forming device that scans the front of the own vehicle with light from the light source.

The structure of the housing 14 is not particularly limited. For example, the housing 14 includes a lamp body having an opening on the front side of the vehicle, and a translucent cover attached so as to cover the opening of the lamp body. A lamp chamber partitioned by the lamp body and the translucent cover accommodates the light source unit 12. The translucent cover constitutes a light emitting surface 16 of the vehicle lamp 2.

The vehicle lamp 2 according to the embodiment includes a first lamp 2a and a second lamp 2b. The first lamp 2a is arranged on the left front end portion of the vehicle 100, and the second lamp 2b is arranged on the right front end portion of the vehicle 100. The arrangement of the first lamp 2a and the second lamp 2b is not particularly limited. The first lamp 2a and the second lamp 2b include the light source unit 12 and the housing 14, respectively.

The imaging device 4 has sensitivity in the wavelength area of the light emitted by the vehicle lamp 2, and captures an image of the front area of the vehicle 100. The imaging device 4 is constituted by a known camera or the like, and captures an image of reflective light L2 of the visible light beam L1 by an object in front of the vehicle. The imaging device 4 is accommodated in the housing 14 of the vehicle lamp 2. The imaging device 4 according to the embodiment includes a first imaging device 4a and a second imaging device 4b. The first imaging device 4a is accommodated in the housing 14 of the first lamp 2a, and the second imaging device 4b is accommodated in the housing 14 of the second lamp 2b.

The cleaning device 8 is a known headlamp cleaner, and may clean the light emitting surface 16 by ejecting a cleaning liquid toward the light emitting surface 16. The notification device 10 notifies the passengers of the vehicle 100 that a foreign substance adheres to the light emitting surface 16. The notification device 10 may be configured by, for example, a warning lamp (indicator) provided on the instrument panel of the vehicle 100.

The foreign substance determination device 6 performs a determination of the adherence of the foreign substance to the light emitting surface 16, based on the image IMG obtained from the imaging device 4. The foreign substance determination device 6 may be configured by a digital processor, for example, a combination of a microcomputer including a CPU and a software program, or a field programmable gate array (FPGA), an application specified IC (ASIC), or the like. The foreign substance determination device 6 may be provided on the vehicle 100 side, or may be incorporated in the vehicle lamp 2.

The foreign substance determination device 6 includes a storage unit 18, a determination unit 20, a lamp controller 22, a cleaning controller 24, and a notification controller 26. Each unit is operated by executing a program stored in a memory by an integrated circuit that constitutes each unit.

The storage unit 18 stores the light distribution pattern PTN formed in the front area by the vehicle lamp 2 in a state where no foreign substance adheres to the light emitting surface 16 as a reference pattern PTNr. In FIG. 2A, a high-beam light distribution pattern is illustrated as an example of the reference pattern PTNr. The reference pattern PTNr is captured, for example, by the imaging device 4 in advance before the shipment of the vehicle lamp system 1. Then, the image IMG including the reference pattern PTNr is stored in the storage unit 18.

Desirably, the front of the own vehicle is captured by the second imaging device 4b in a state where the first lamp 2a is turned ON and the second lamp 2b is turned OFF, and the image IMG obtained thereby is stored in the storage unit 18 as an image IMG including the reference pattern PTNr of the first lamp 2a. Further, the front of the own vehicle is captured by the first imaging device 4a in a state where the first lamp 2a is turned OFF and the second lamp 2b is turned ON, and the image IMG obtained thereby is stored in the storage unit 18 as an image IMG including the reference pattern PTNr of the second lamp 2a.

The determination unit 20 compares the light distribution pattern PTN captured by the imaging device 4, that is, the light distribution pattern PTN included in the image IMG of the imaging device 4 and the reference pattern PTNr, and determines whether a foreign substance adheres to the light emitting surface 16. In a state where a foreign substance adheres to the light emitting surface 16, as illustrated in FIG. 2B, a light shielding portion 28 caused by the foreign substance is included in the light distribution pattern PTN. The determination unit 20 may compare the reference pattern PTNr and the light distribution pattern PTN based on a known detection algorithm, and determine whether a foreign substance adheres to the light emitting surface 16.

The lamp controller 22 switch an ON/OFF of the first lamp 2a and the second lamp 2a independently from each other. Then, the determination unit 20 according to the embodiment compares the light distribution pattern PTN captured by the imaging device 4 in a state where one lamp is turned ON and the other lamp is turned OFF with the reference pattern PTNr, and determines whether a foreign substance adheres to the light emitting surface 16 of the lamp, which is turned ON.

As described above, the imaging device 4 according to the embodiment includes the first imaging device 4a accommodated in the housing 14 of the first lamp 2a, and the second imaging device 4b accommodated in the housing 14 of the second lamp 2b. The determination unit 20 compares the light distribution pattern PTN captured by the imaging device 4 accommodated in the housing 14 of the lamp, which is turned OFF, in a state where one lamp is turned ON and the other lamp is turned OFF with the reference pattern PTNr, and determines the adhesion of the foreign substance to the light emitting surface 16 of the lamp, which is turned OFF.

FIG. 1 illustrates a state where the front area is captured by the second imaging device 4b in a state where the first lamp 2a is turned ON and the second lamp 2b is turned OFF. In this case, the light distribution pattern PTN included in the image IMG obtained from the second imaging device 4b is compared with the reference pattern PTNr of the first lamp 2a, thereby determining whether a foreign substance adheres to the light emitting surface 16 of the first lamp 2a.

The cleaning controller 24 controls the cleaning device 8 based on the determination result of the determination unit 20. For example, when the determination unit 20 determines that a foreign substance adheres to the light emitting surface 16, a signal that indicates the adhesion of the foreign substance is sent to the cleaning controller 24. When the signal is received, the cleaning controller 24 sends a driving signal to the cleaning device 8. When the driving signal is received, the cleaning device 8 ejects a cleaning liquid to the light emitting surface 16.

The notification controller 26 controls the notification device 10 based on the determination result of the determination unit 20. For example, when the determination unit 20 determines that a foreign substance adheres to the light emitting surface 16, a signal that indicates the adherence of the foreign substance is sent to the notification controller 26. When the signal is received, the notification controller 26 sends a driving signal to the notification device 10. When the driving signal is received, the notification device 10 turns ON the warning lamp.

Desirably, the foreign substance determination device 6 performs a determination of the adherence of the foreign substance under the condition in which the light distribution pattern PTN is stably formed. The condition in which the light distribution pattern PTN is stably formed includes, for example, when the driving vehicle 100 is stopped, or when the engine is started. The time when the vehicle 100 is stopped may be detected by the foreign substance determination device 6 receiving a vehicle speed signal from the ECU of the vehicle 100 or the like. The time when the engine is started may be detected by the foreign substance determination device 6 receiving an engine rotation signal from the ECU of the vehicle 100 or the like.

Figure 3:
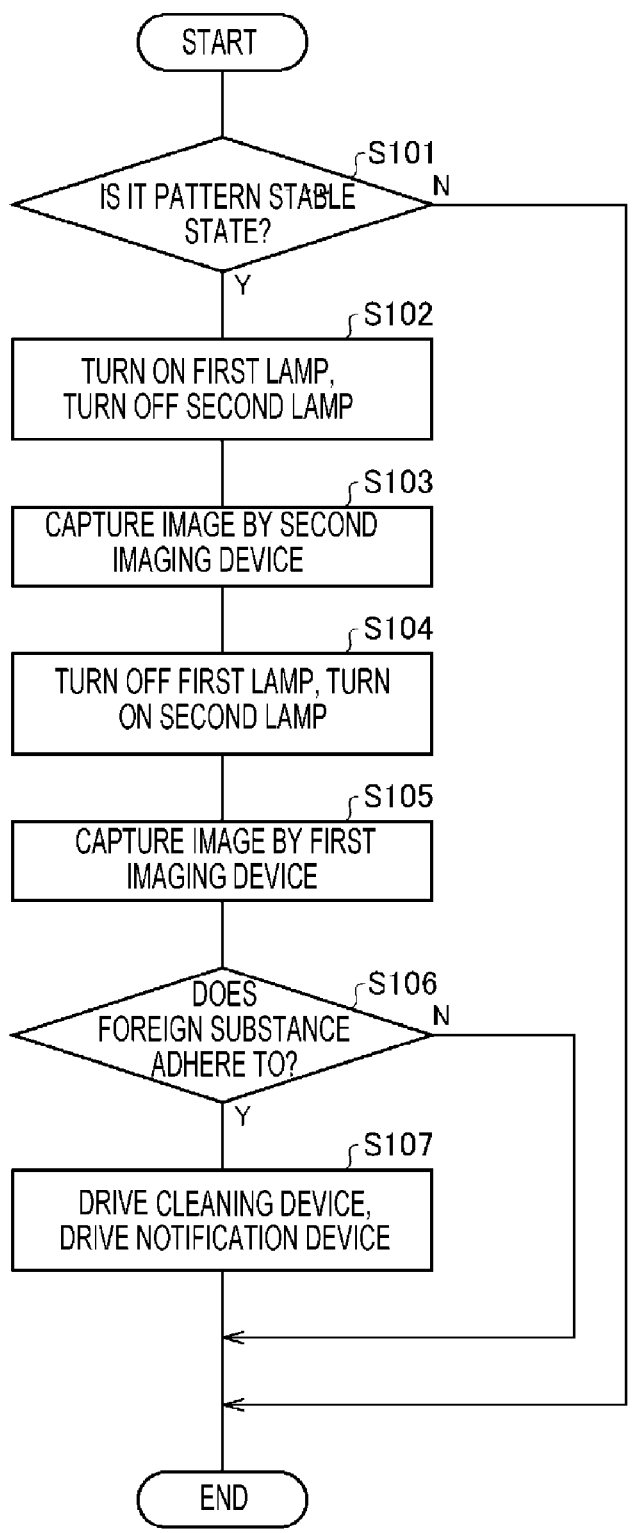
FIG. 3 is a flowchart of a foreign substance determination control according to an example.

FIG. 3 is a flowchart of a foreign substance determination control according to an example. This flow is repeatedly executed at a predetermined timing by the foreign substance determination device 6 when an ignition switch of the vehicle 100 is turned ON. First, the foreign substance determination device 6 determines whether or not the light distribution pattern PTN is stably formed (S101). When the light distribution pattern PTN is not stably formed (N in S101), this routine is ended. When the light distribution pattern PTN is stably formed (Y in S101), the foreign substance determination device 6 turns ON the first lamp 2a, and turns OFF the second lamp 2b (S102). In this state, the foreign substance determination device 6 captures an image of the front area of the vehicle 100 by the second imaging device 4b (S103). Subsequently, the foreign substance determination device 6 turns OFF the first lamp 2a, and turns ON the second lamp 2b (S104). In this state, the foreign substance determination device 6 captures an image of the front area of the vehicle 100 by the first imaging device 4a (S105).

The foreign substance determination device 6 compares the light distribution pattern PTN captured by the second imaging device 4b and the reference pattern PTNr of the first lamp 2a stored in the storage unit 18 so as to determine whether the foreign substance adheres to the light emitting surface 16 of the first lamp 2a (S106). Further, the foreign substance determination device 6 compares the light distribution pattern PTN captured by the first imaging device 4b and the reference pattern PTNr of the second lamp 2b stored in the storage unit 18 so as to determine whether the foreign substance adheres to the light emitting surface 16 of the second lamp 2a (S106).

When a foreign substance adheres to the light emitting surface 16 of any of the lamps (Y in S106), the foreign substance determination device 6 drives the cleaning device 8 to clean the light emitting surface 16, and drives the notification device 10 to notify the driver of the vehicle 100 of the adherence of the foreign substance (S107). Thereafter, this routine is ended. When a foreign substance adheres to the light emitting surface 16 of one lamp, and no foreign substance adheres to the light emitting surface 16 of the other lamp, the foreign substance determination device 6 may drive the cleaning device 8 corresponding the light emitting surface 16 to which the foreign substance adheres, or may drive both cleaning devices 8 uniformly. When only the cleaning device 8 corresponding to the light emitting surface 16 to which the foreign substance adheres is driven, it is possible to avoid unnecessary cleaning of the light emitting surface 16 to which no foreign substance adheres. When both the cleaning devices 8 are driven uniformly, it is possible to simplify the circuit structure of the vehicle lamp system as compared with the case where each cleaning device 8 is independently driven. When no foreign substance adheres to the light emitting surface 16 of any of the lamps (N in S106), the cleaning device 8 or the notification device 10 is not driven, and the routine is ended.

As described above, the vehicle lamp system 1 according to the embodiment includes the vehicle lamp 2 capable of emitting light to the front area of the vehicle 100 to form the predetermined light distribution pattern PTN, the imaging device 4 configured to capture an image of the front area, and the foreign substance determination device 6 including the storage unit 18 that stores the light distribution pattern PTN formed in the front area by the vehicle lamp 2 in a state where no foreign substance adheres to the light emitting surface 16 as the reference pattern PTNr, and the determination unit 20 that compares the light distribution pattern PTN captured by the imaging device 4 with the reference pattern PTNr and determines whether a foreign substance adheres to the light emitting surface 16.

In the vehicle lamp system 1 according to the embodiment, the foreign substance determination device 6 automatically determines whether the foreign substance adheres to the light emitting surface 16. Therefore, it is possible to eliminate annoyance felt by the driver when the driver is forced to monitor the adherence of the foreign substance. Further, it is possible to prevent the state where the foreign substance adheres to the light emitting surface 16 from being left for a long period time. Therefore, the safety of vehicle driving may be increased. Further, the foreign substance determination device 6 uses the light distribution pattern PTN as a criterion for determining the adherence of the foreign substance. As a result, it is possible to increase the degree of freedom in installing the imaging device 4 as compared with a case where the imaging device 4 directly captures an image of the light emitting surface 16 to detect the adherence of the foreign substance.

Further, the vehicle lamp 2 includes the first lamp 2a and the second lamp 2b, and the foreign substance determination device 6 includes the lamp controller 22 configured to independently switch the ON/OFF of the first lamp 2a and the second lamp 2b. Then, the determination unit 20 compares the light distribution pattern PTN captured by the imaging device 4 in a state where one lamp is turned ON and the other lamp is turned OFF, with the reference pattern PTNr, and determine whether a foreign substance adheres to the light emitting surface 16 of the lamp, which is turned ON.

Therefore, it is possible to determine to which lamp the foreign substance adheres when the vehicle lamp system 1 includes a plurality of lamps. Further, it is possible to clean only the lamp to which the foreign substance adheres by the cleaning device 8. The ON/OFF of the first lamp 2a and the second lamp 2b may be uniformly switched to determine the adherence of the foreign substance without distinguishing the first lamp 2a and the second lamp 2b.

Further, the vehicle lamp 2 includes the light source unit 12 and the housing 14 that accommodates the light source unit 12. The imaging device 4 is accommodated in the housing 14. Therefore, before the vehicle lamp 2 is assembled to the vehicle 100, the reference pattern PTNr is captured by the imaging device 4 and stored in the storage unit 18. As a result, the vehicle lamp system 1 according to the embodiment may be realized more easily. Further, the projection angle of the light distribution pattern PTN of the vehicle lamp 2 and the angle of view of the imaging device 4 may be brought close to each other. As a result, it is possible to more accurately detect the adherence of a foreign substance adheres, the adherence position, or the like.

The imaging device 4 may be arranged outside the housing 14. Therefore, the vehicle lamp 2 may be miniaturized. Further, for example, a camera in the vehicle interior may be used as the imaging device 4, so that the number of parts of the vehicle lamp system 1 or the mounting cost may be reduced.

Further, the first lamp 2a and the second lamp 2b includes the light source unit 12 and the housing 14, respectively, and the imaging device 4 includes the first imaging device 4a accommodated in the housing 14 of the first lamp 2a, and the second imaging device 4b accommodated in the housing 14 of the second lamp 2b. Then, the determination unit 20 compares the light distribution pattern PTN captured by the imaging device 4 accommodated in the housing 14 of the lamp, which is turned OFF, in a state where one lamp is turned ON and the other lamp is turned OFF, with the reference pattern PTNr, and determines whether a foreign substance adheres to the light emitting surface 16 of the lamp, which is turned OFF.

When the imaging device 4 is accommodated in the housing 14, when the light source unit 12 accommodated in the same housing 14 is turned ON, the imaging device 4 may be irradiated with the light reflected by the light emitting surface 16. When the light reflected by the light emitting surface 16 reaches the imaging device 4, this light may reflect the image IMG, so that it is difficult to acquire the image IMG in which the light distribution pattern PTN is accurately captured. As a result, the accuracy of determination of the adherence of the foreign substance may be decreased.

In contrast, in the vehicle lamp system 1 according to the embodiment, the light distribution pattern PTN projected to the front area is captured by the imaging device 4 accommodated in the lamp which is turned OFF. As a result, it is possible to capture the light distribution pattern PTN more accurately, and thus, the accuracy of determination of the adherence of the foreign substance may be increased. Further, since the light source unit 12 and the imaging device 4 may be arranged without concerning the reflection of the reflected light on the image IMG, it is possible to increase the degree of freedom in designing the vehicle lamp system 1.

The light distribution pattern PTN may be acquired by the imaging device 4 accommodated in the same housing 14 as the lamp which is turned ON. In this case, for example, the imaging device 4 is accommodated only in the housing 14 of the first lamp 2a, and each of the light distribution pattern PTN of the first lamp 2a and the light distribution pattern PTN of the second lamp 2b is captured by the imaging device 4. Therefore, the number of imaging devices 4 is reduced, and thus, the mounting cost of the vehicle lamp system 1 may be reduced.

Further, the vehicle lamp system 1 includes the cleaning device 8 configured to clean the light emitting surface 16 of the vehicle lamp 2, and the foreign substance determination device 6 includes the cleaning controller 24 configured to control the cleaning device 8 based on the determination result of the determination unit 20. Therefore, it is possible to remove the foreign substance that adheres to the light emitting surface 16. Further, the vehicle lamp system 1 includes the notification device 10 configured to notify the passenger of the vehicle 100 that a foreign substance adheres to the light emitting surface 16 of the vehicle lamp 2, and the foreign substance determination device 6 includes the notification controller 26 configured to control the notification device 10 based on the determination result of the determination unit 20. Therefore, it is possible to notify the driver of the adherence of the foreign substance.

Therefore, it is possible to remove the foreign substance that adheres to the light emitting surface 16 at an early stage, by providing the cleaning controller 24 or notification controller 26. Therefore, the safety of vehicle driving may be increased. The foreign substance determination device 6 may include only one of the cleaning controller 24 and the notification controller 26.

In the above, the embodiments of the present disclosure have been described in detail. The above-described embodiment merely shows a specific example in carrying out the present disclosure. The contents of the embodiments do not limit the technical scope of the present disclosure. Various design changes such as changes, additions, and deletions of components may be made without departing from the ideas of the present disclosure defined in the claims. New embodiments with the design change have both effects of the combined embodiment and the modification. In the above-described embodiment, the contents related to the possibility of such design changes are emphasized by using expressions such as "according to the embodiment," "in the embodiment," or the like, but the design changes are allowed even in the contents with no such expressions. Any combination of the above components is also effective as an aspect of the present disclosure. The hatching given to the cross-section of the drawing does not limit the material of the object to which the hatching is given.

The present disclosure according to the above-described embodiment may be specified by the items described below.

Item 1

The foreign substance determination device 6 includes the storage unit 18 that stores the light distribution pattern PTN formed by the vehicle lamp 2 that emits light to the front area of the vehicle to form the predetermined light distribution pattern PTN in the front area in a state where no foreign substance adheres to the light emitting surface 16 as the reference pattern PTNr, and the determination unit 20 that compares the light distribution pattern PTN captured by the imaging device 4 that captures an image of the front area, with the reference pattern PTNr, and determines whether a foreign substance adheres to the light emitting surface 16.

Item 2

A foreign substance determination method includes comparing a light distribution pattern formed by the vehicle lamp 2 that emits light to the front area of the vehicle 100 to form the predetermined light distribution pattern PTN in a state where no foreign substance adheres to the light emitting surface 16, with the light distribution pattern PTN captured by the imaging device 4 that captures an image of the front area, and determining whether a foreign substance adheres to the light emitting surface 16.

INDUSTRIAL APPLICABILITY

The present disclosure may be used in a vehicle lamp system, a foreign substance determination device, and a foreign substance determination method.

DESCRIPTION OF SYMBOLS

1: vehicle lamp system
2: vehicle lamp
2a: first lamp
2b: second lamp
4 imaging device
4a: first imaging device
4b: second imaging device
6: foreign substance determination device
8: cleaning device
10: notification device
12: light source unit
14: housing
16: light emitting surface
18: storage unit
20: determination unit
22: lamp controller
24: cleaning controller
26: notification controller

What is claimed is:

1. A vehicle lamp system comprising:
a vehicle lamp configured to emit light to a front area of a vehicle, and form a predetermined light distribution pattern;
a camera configured to capture an image of the front area of the vehicle; and
a foreign substance determinator including:
a memory that stores a light distribution pattern formed in the front area by the vehicle lamp in a state where no foreign substance adheres to a light emitting surface as a reference pattern, and
determination circuitry configured to compare a light distribution pattern captured by the camera with the reference pattern stored in the memory and determine whether a foreign substance adheres to the light emitting surface based on a comparison result when the vehicle stops or an engine of the vehicle starts.

2. The vehicle lamp system according to claim 1, wherein the vehicle lamp includes a first lamp and a second lamp,
the foreign substance determinator further includes a lamp controller that independently switches an ON/OFF of the first lamp and the second lamp, and
the determination circuitry is further configured to compare a light distribution pattern captured by the camera in a state where one of the first and second lamps is turned ON and a remaining one is turned OFF with the reference pattern, and determine whether a foreign substance adheres to the light emitting surface of the one of the first and second lamps which is turned ON.

3. The vehicle lamp system according to claim 1, wherein the vehicle lamp includes a light source, and a housing that accommodates the light source, and
the camera is accommodated in the housing.

4. The vehicle lamp system according to claim 2, wherein each of the first lamp and the second lamp includes a light source and a housing that accommodates the light source,
the camera includes a first camera accommodated in the housing of the first lamp, and a second camera accommodated in the housing of the second lamp, and
in a state where one of the first and second lamps is turned ON and a remaining one is turned OFF, the determination circuitry is further configured to compare a light distribution pattern captured by the camera accommodated in the housing of the remaining one which is turned OFF, with the reference pattern, and determine whether a foreign substance adheres to the light emitting surface of the one of the first and second lamps which is turned ON.

5. The vehicle lamp system according to claim 1, further comprising:
a cleaner configured to clean the light emitting surface,
wherein the foreign substance determinator further includes a cleaning controller that controls the cleaner based on a determination result of the determination circuitry.

6. The vehicle lamp system according to claim 1, further comprising:
a notifier configured to notify a passenger of the vehicle in which the foreign substance adheres to the light emitting surface,
wherein the foreign substance determinator further includes a notification controller that controls the notifier based on a determination result of the determination circuitry.

7. A foreign substance determination device comprising:
storage circuitry configured to store a light distribution pattern formed by a vehicle lamp that emits light to a front area of a vehicle to form a predetermined light distribution pattern, in a state where no foreign substance adheres to a light emitting surface, as a reference pattern, and
determination circuitry configured to compare a light distribution pattern captured by a camera that captures an image of the front area, with the reference pattern, and determine whether a foreign substance adheres to the light emitting surface based on a comparison result when the vehicle stops or an engine of the vehicle starts.

8. A foreign substance determination method comprising:
providing a foreign substance determination device including:
- storage circuitry configured to store a light distribution pattern formed by a vehicle lamp that emits light to a front area of a vehicle to form a predetermined light distribution pattern, in a state where no foreign substance adheres to a light emitting surface, as a reference pattern, and
- determination circuitry configured to compare a light distribution pattern captured by a camera that captures an image of the front area, with the reference pattern, and determine whether a foreign substance adheres to the light emitting surface based on a comparison result, comparing the light distribution pattern captured by the camera with the reference pattern; and
determining whether the foreign substance adheres to the light emitting surface based on a result at the comparing when the vehicle stops or an engine of the vehicle starts.

* * * * *